Figure 1:
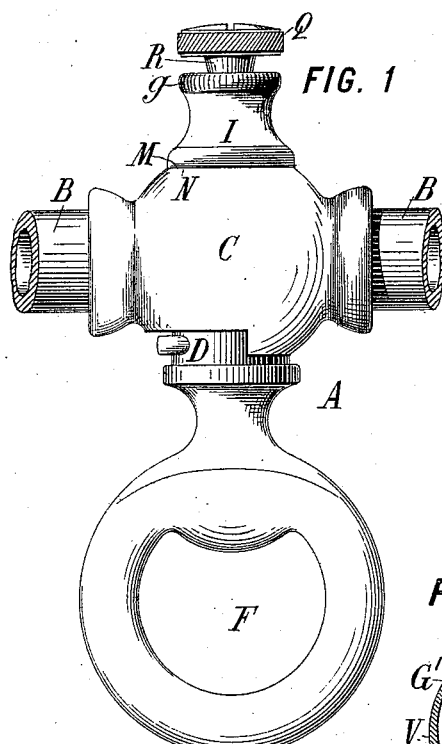

(No Model.)

J. A. HAMILTON.
FASTENING FOR GAS COCKS, &c.

No. 576,669.    Patented Feb. 9, 1897.

WITNESSES:
Fred White
Thomas F. Wallace

INVENTOR:
John A. Hamilton,
By his Attorneys,
Arthur C. Fraser & Co.

THE NORRIS PETERS CO., PHOTO-LITHO., WASHINGTON, D. C.

UNITED STATES PATENT OFFICE.

JOHN A. HAMILTON, OF NEW YORK, N. Y.

FASTENING FOR GAS-COCKS, &c.

SPECIFICATION forming part of Letters Patent No. 576,669, dated February 9, 1897.

Application filed June 11, 1896. Serial No. 595,075. (No model.)

*To all whom it may concern:*

Be it known that I, JOHN A. HAMILTON, a citizen of the United States, residing in the city, county, and State of New York, have invented certain new and useful Improvements in Fastenings for Gas-Cocks and other Rotative Plugs, of which the following is a specification.

This invention relates to articles, such as gas-cocks, joints, or other devices, in which a plug or member is mounted in a socket piece or member in such manner that the one is rotative relatively to the other, usually the plug being the rotative part and having only a limited rotary movement.

In such devices it is desirable to provide for adjustment of the plug axially within the socket to attain the desired fit or friction between the two. This has usually been effected by means of a nut adjustable on the screw-threaded end of the plug and bearing against the socket-piece, or by tapping a screw into the plug and interposing a non-rotative washer surrounding the plug between the head of the screw and the socket-piece. These simple provisions have been found liable to loosen in use, to avoid which I heretofore invented a safety-fastening comprising a lock between the plug and its adjustable fastening-nut, the lock being a transverse part carried by the nut and engaging the plug to prevent accidental loosening of the parts after adjustment. This construction is shown in my United States Letters Patent No. 559,173, dated April 28, 1896.

My present invention aims to provide improved and simple constructions for insuring against accidental loosening of the fastening provision. To this end in carrying out the preferred form of my present improvement as applied to a gas-cock I provide the plug with a screw-thread receiving the thread of the fastening-nut in such manner that the nut can be adjusted to effect the desired fit of the plug in the socket-piece, and I provide a safety-lock between the plug and nut, preferably consisting of a screw screwing into an axial thread provided for it in the plug and actuating a movable part on or carried by the latter which is forced by the screw into engagement with the nut in such manner that relative movement between the nut and plug will be prevented, while any tendency to cause such movement will be transmitted from the nut to the plug, or vice versa, and will be prevented from exerting any loosening effect on the locking-screw, and I provide certain features of improvement in the construction of the parts, all of which will be more fully hereinafter described.

Figure 2:
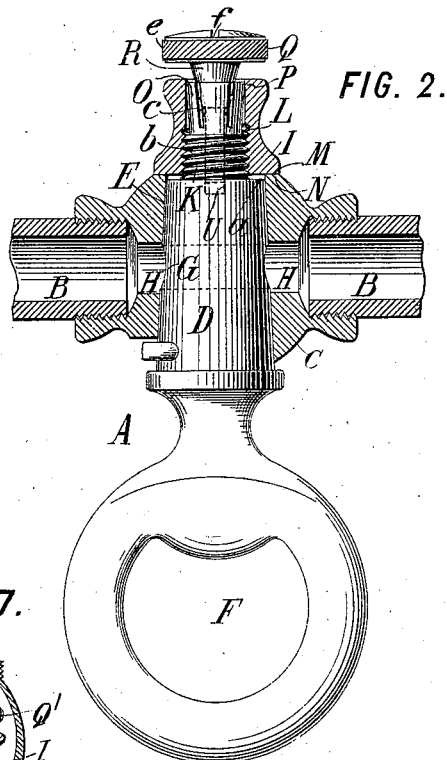
Figure 3:
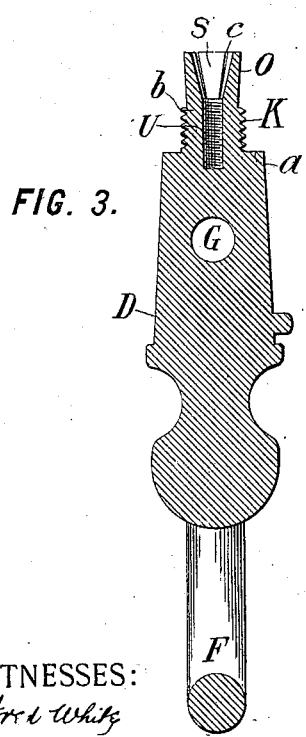
Figure 7:
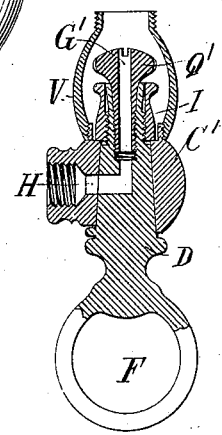
Figure 4:
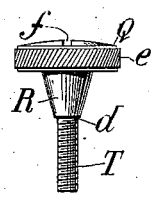
Figure 6:
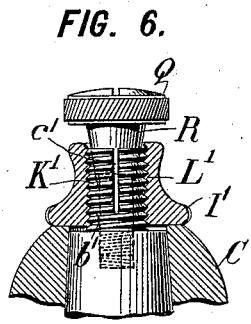
Figure 5:
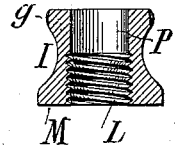

In the accompanying drawings, which show certain adaptations of my present improvements, Figure 1 is a side elevation of a straightway gas-cock provided with the preferred form of my invention. Fig. 2 is a vertical axial section thereof, the plug and safety-screw being in side elevation. Fig. 3 is an axial section of the plug alone. Fig. 4 is a side elevation of the safety-screw alone. Fig. 5 is an axial section of the nut. Fig. 6 is a fragmentary view corresponding to Fig. 2, showing a modification; and Fig. 7 is an axial section, on a smaller scale, showing the form of the invention shown in Figs. 1 to 5, inclusive, as applied to an elbow cock or joint.

Referring to the drawings, let A indicate a gas-cock or other article; B, the pipes or conduits communicating therewith; C, the socket-piece or body of the cock; D, the plug thereof; E, the socket into which this plug fits; F, the handle of the plug; G, the duct through the plug; H, the coinciding ducts in the body; I, the fastening-nut for the plug; K, the screw-thread on the plug; L, the reciprocal thread on the nut by which it engages with the plug and is adjusted thereon; M, the bearing-face of the nut, and N the bearing on the body against which the face M abuts to hold the plug in position.

As thus far described, the parts may be of any usual or suitable construction and of any character in which there is a relative rotative movement between the body and plug. The body shown has a slight taper throughout its socket E, and the plug D is correspondingly tapered, so that a tightness of fit and a suitable friction can be obtained by adjusting the plug more or less into the socket. The upper end *a* of the plug is sufficiently within the socket to permit upward adjustment in case wear renders this necessary. The fastening I and plug D, as usual, have suitable screw-threads K and L, by which the fastening can be adjusted axially of the plug to draw the latter into the body to the desired extent, the screw-thread on the plug being preferably a male thread and that on the fastening being a female thread. In such constructions the friction between the face M and bearing N tends to move the fastening relatively to the plug and destroy its adjustment. According to the preferred form of my present invention I overcome or resist this tendency by providing on one of the parts a portion movable laterally against the other part and by providing a screw or other suitable means adjustable on the part carrying such portion and when in one position forcing such portion into position to lock the fastening and plug immovably together, the screw being in contact only with the part carrying it, so that it is free from danger of loosening by direct contact with the part locked. This may be variously accomplished; but I prefer to employ the construction shown in Figs. 1 to 5, wherein the plug D is formed with an integral projection b on its upper end, on which projection the thread K is cut as a male thread, extending from the end a of the plug outwardly a suitable distance along the projection, beyond which, or at its outer end, the projection is formed with locking or holding portions O, best formed by slitting or dividing the end of the plug, opposite which portions the fastening I has opposing faces P, adapted to be engaged by the portions O to lock the parts against relative rotation. The portions O are here shown as substantially cylindrical walls interrupted by longitudinal slits c and distorted against the portion P of the fastening, which is here shown as a substantially cylindrical smooth face extending from the outer end of the fastening-nut, partly through the latter, of a diameter approximately equaling the inner diameter of the thread L therein and of slightly greater diameter than the normal diameter of the faces O of the plug when they are in their normal position, so that then the nut can be freely adjusted on the plug.

The faces O and P may be of any character which will permit the screwing of the nut onto the plug and still will permit the forcing of these faces into such intimate contact that accidental movement of the nut will be prevented.

The locking portion or portions O are best manipulated by the locking-screw Q, which has for this purpose a taper or cone R, engaging inner faces S in the plug and wedging these faces apart in order to distort the locking portions into clamping engagement with the nut. These portions are preferably sufficiently elastic to return toward the normal position when the wedge is released.

The wedge R is shown as a male wedge and the opposing faces S as a female socket therefor. When the parts are thus constructed, it is best to provide the wedge with a male screw-thread T, engaging a female thread U in the plug and extending from the faces S thereof well through the projection d. The thread T abruptly leaves the wedge R at a shoulder d before the latter reaches the diameter of the screw, and the thread U extends far enough into the plug so that abundant opportunity for inward adjustment of the wedge is provided. Above the wedge R the screw preferably has a wide knurled head e, by which it can be grasped to adjust it and which overhangs and conceals the aperture in the nut I and the upper end of the projection b, but which does not contact with the nut. Preferably the head also a notch f for a screw-driver.

The wedge forces the locking portions of the stem into intimate engagement with the nut when the screw Q is screwed in, thus preventing any relative movement of the fastening, but as soon as the screw is screwed outwardly enough to permit the faces O to retract the nut I can be readily turned in order to screw it to any extent on or off the thread K to tighten or loosen the adjustment. Such turning can more conveniently be done if the nut I is provided with a suitable knurled or grasping portion g. Immediately the desired adjustment is obtained it can be made permanent by holding the plug by its handle and again screwing home the screw Q until the clamping-faces are sufficiently engaged. The screw Q is out of contact with the nut, contacting solely with the different portions of the plug, and hence it is free from any tendency to be loosened by relative strain between the plug and nut or vibration or movement between these members.

It will be seen that my invention provides improvements which can be readily and advantageously availed of for effecting a simple and secure fastening between plugs and socket-pieces for gas-cocks and other devices, and it will be understood that the invention is not limited to the particular details of construction, arrangement, and combination, nor to the particular use, shown and described as constituting the preferred form of the invention, but that it can be employed according to such modifications, as circumstances or the judgment of those skilled in the art may dictate, without departing from the spirit of the invention.

Fig. 6 shows a modification in which the thread K' extends the entire length of the projection b', and the thread L' of the nut I' is similarly extended, slots c' being relied on for permitting expansion of the walls of the projection against the walls of the nut.

Fig. 7 shows a construction in all respects identical with that described as to Figs. 1 to 5, inclusive, except that an axial duct G' extends through the screw Q' and the plug and communicates with the duct H in the body C', on the top of which is screwed a shell V, which carries off the flow through the duct and incloses the fastening. This construction is desirable for joint-cocks and other articles.

What I claim is, in fastenings for rotative plugs and other devices, the following-defined novel features and combinations, substantially as and for the purpose hereinbefore set forth, namely:

1. In fastenings and the like, a socket-piece having a socket, in combination with a member in said socket, having a laterally-expansible projection beyond the latter, said parts movable the one relatively to the other, an annular fastening having a tubular interior passing over said projection and holding said member in said socket, said member having a smooth internal wedge-surface, a smooth wedge acting thereagainst, and a screw engaging said member and forcing said wedge against said surface for expanding the end of said member against said fastening to prevent independent movement of the latter.

2. In fastenings, a socket-piece having a socket, in combination with a plug movable therein and having a projecting end having an external screw-thread, an expanding portion, an internal smooth surface, and an internal screw-thread, a tubular fastening-nut having an internal thread screwing on the external thread of said member and having an internal face surrounding the expanding portion thereof, and a screw engaging the internal thread of said member, having a distinct wedge portion expanding the plug thereof against said fastening, and having a head beyond the latter.

In witness whereof I have hereunto signed my name in the presence of two subscribing witnesses.

JOHN A. HAMILTON.

Witnesses:
   GEORGE H. FRASER,
   THOMAS F. WALLACE.